(12) United States Patent
Mannemala et al.

(10) Patent No.: US 9,591,497 B2
(45) Date of Patent: Mar. 7, 2017

(54) WIRELESS LINK QUALITY MONITORING (71) Applicant: Apple Inc., Cupertino, CA (US)

(72) Inventors: Chaitanya Mannemala, Santa Clara, CA (US); Kapil Chhabra, Cupertino, CA (US); Franco Travostino, San Jose, CA (US); Veerendra Boodnnavar, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 211 days.

(21) Appl. No.: 14/291,765

(22) Filed: May 30, 2014

(65) Prior Publication Data

US 2015/0350933 A1    Dec. 3, 2015

(51) Int. Cl.
  *H04W 24/04*   (2009.01)
  *H04W 76/02*   (2009.01)
  *H04W 84/12*   (2009.01)
(52) U.S. Cl.
  CPC ......... *H04W 24/04* (2013.01); *H04W 76/027* (2013.01); *H04W 84/12* (2013.01)
(58) Field of Classification Search
  None
  See application file for complete search history.

(56) References Cited

U.S. PATENT DOCUMENTS

| 7,197,015 | B2 | 3/2007 | Touag |
| 7,450,552 | B2 | 11/2008 | Behroozi |
| 2005/0020299 | A1 | 1/2005 | Malone et al. |
| 2010/0041389 | A1* | 2/2010 | Cave ............... H04W 76/028 455/423 |
| 2012/0243645 | A1 | 9/2012 | Bougard |
| 2013/0016632 | A1 | 1/2013 | Mujtaba et al. |
| 2013/0272269 | A1 | 10/2013 | Srivastava et al. |
| 2015/0098392 | A1* | 4/2015 | Homchaudhuri ..... H04W 48/20 370/329 |
| 2015/0103812 | A1* | 4/2015 | Zhao .................. H04W 48/16 370/338 |
| 2015/0117183 | A1* | 4/2015 | Heo .................... H04L 5/0032 370/228 |

OTHER PUBLICATIONS

International Search Report & Written Opinion, Application No. PCT/US2015/037586, mailed Sep. 25, 2015, 11 pages.

* cited by examiner

*Primary Examiner* — Kevin C Harper
*Assistant Examiner* — Derrick V Rose
(74) *Attorney, Agent, or Firm* — Meyertons Hood Kivlin Kowert & Goetzel, P.C.; Jeffrey C. Hood (57) ABSTRACT

Wi-Fi link health monitoring by a wireless device. Signal strength (e.g., RSSI) of a Wi-Fi link may be monitored. If the signal strength is low, further link quality metrics may be monitored. If it is determined that health of the Wi-Fi link is poor based on monitoring signal strength and other link quality metrics, roaming to a different Wi-Fi network may be performed, the Wi-Fi link may be disconnected, and/or an application processor of the wireless device may be woken.

20 Claims, 7 Drawing Sheets

WIRELESS LINK QUALITY MONITORING

FIELD

The present disclosure relates to wireless devices, and more particularly to a system and method for a wireless device to monitor the quality of a wireless communication link such as a Wi-Fi link.

DESCRIPTION OF THE RELATED ART

Wireless communication systems are rapidly growing in usage. Further, wireless communication technology has evolved from voice-only communications to also include the transmission of data, such as Internet and multimedia content. There exist numerous different wireless communication technologies and standards. Some examples of wireless communication standards include GSM, UMTS (WCDMA), LTE, LTE Advanced (LTE-A), 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

SUMMARY

Embodiments are presented herein of, inter alia, a method for a wireless user equipment (UE) device to monitor the health of a Wi-Fi link, and of a device configured to implement the method.

According to the techniques described herein, signal strength (e.g., RSSI) of a Wi-Fi link may be monitored as a first indicator of Wi-Fi link health. One or more thresholds (e.g., with a delta between them to provide hysteresis) may be used to distinguish between 'good' and 'bad' Wi-Fi link health states on the basis of signal strength.

If signal strength is 'bad', further metrics may be monitored and/or additional techniques may be provided to more precisely determine the reliability and health of the Wi-Fi link. If it is determined that the Wi-Fi link is unreliable or unhealthy, one or more actions may be taken in response.

The metrics and techniques used, and the actions taken in response to determining unreliability of a Wi-Fi link, may differ in different scenarios considered herein. Among the scenarios considered are situations in which the wireless device is 'sleeping' or in a low power mode, and situations in which the wireless device is actively being used.

Note that the techniques described herein may be implemented in and/or used with a number of different types of devices, including but not limited to, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the preferred embodiment is considered in conjunction with the following drawings, in which.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™) laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication. A UE which may be used in a Wi-Fi context may alternatively be referred to as a "station" or "STA" in some cases.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

IEEE 802.11—refers to technology based on IEEE 802.11 wireless standards such as 802.11a, 802.11.b, 802.11g, 802.11n, 802.11-2012, 802.11ac, and/or other IEEE 802.11 standards. IEEE 802.11 technology may also be referred to as "Wi-Fi" or "wireless local area network (WLAN)" technology.

Figure 1:
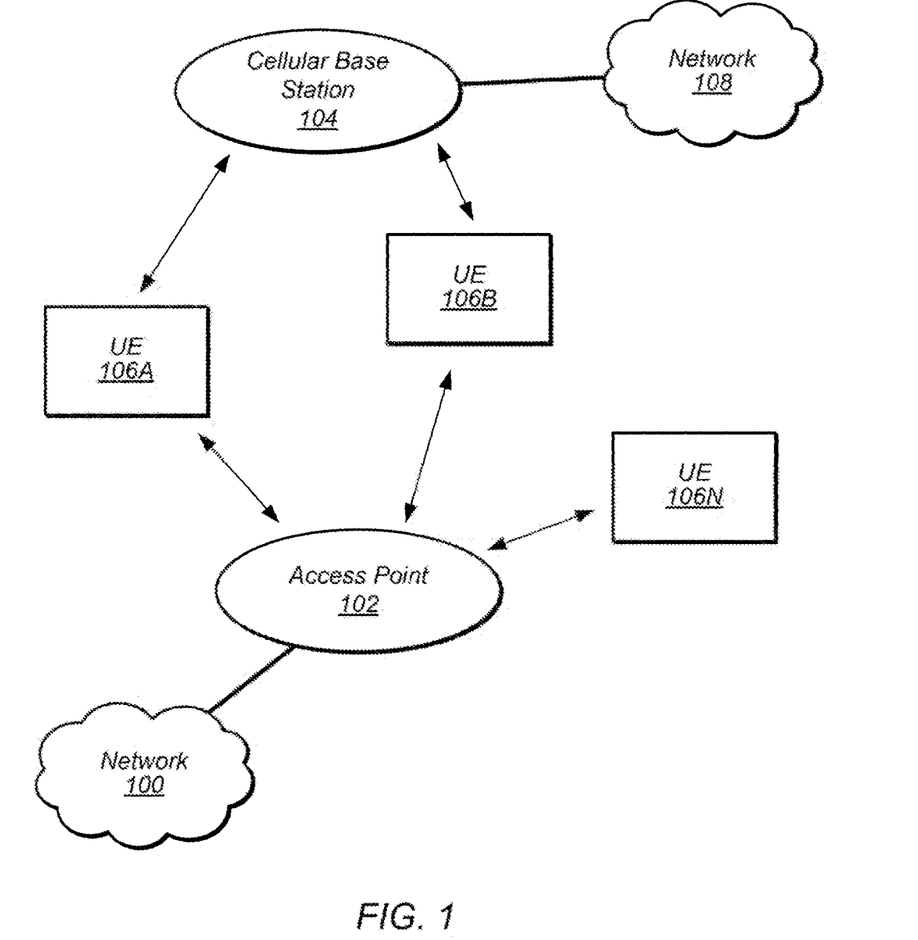
FIG. 1 illustrates an exemplary (and simplified) wireless communication system.
Figure 2:
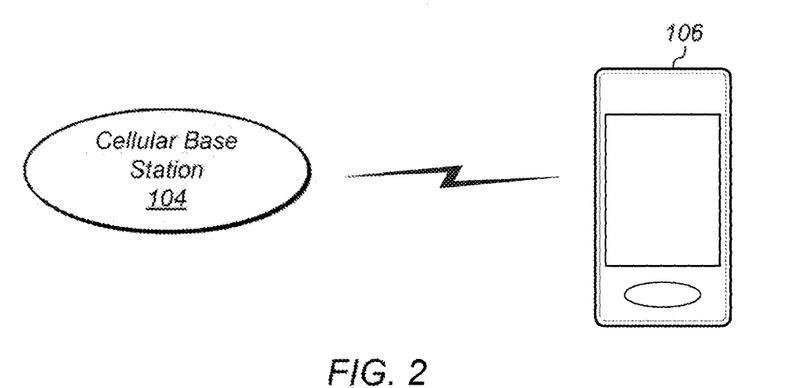
FIG. 2 illustrates a base station (BS) in communication with a user equipment (UE) device.

FIGS. 1-2—Communication System

FIG. 1 illustrates an exemplary (and simplified) wireless communication system. It is noted that the system of FIG. 1 is merely one example of a possible system, and embodiments may be implemented in any of various systems, as desired.

As shown, the exemplary wireless communication system includes an access point 102 which communicates over a transmission medium with one or more user devices 106A, 106B, etc., through 106N. Each of the user devices may be referred to herein as a "user equipment" (UE). Thus, the user devices are referred to as UEs or UE devices.

The access point 102 may be an access point providing a wireless local area network (WLAN). The access point 102 may be equipped to communicate with a network 100 (e.g., a wide area network (WAN), such as the Internet, among various possibilities). Thus, the access point 102 may facilitate communication between the UEs 106 and/or between the UEs 106 and the network 100. The access point 102 and the UEs 106 may be configured to communicate over the transmission medium using Wi-Fi, including any of various versions of IEEE 802.11 (e.g., a, b, g, n, ac, etc.).

One or more of the UEs 106 (e.g., UE 106A) may also be configured to communicate with a base station 104. The base station 104 may be a base transceiver station (BTS) or cell site (a "cellular base station"), and may include hardware that enables wireless communication with UEs 106 according to one or more cellular communication protocols. The UE 106 and the cellular base station 104 may communicate using any of various cellular communication technologies such as GSM, UMTS (WCDMA), LTE, LTE-Advanced (LTE-A), 3GPP2 CDMA2000 (e.g., 1×RTT, 1×EV-DO, HRPD, eHRPD), etc.

As shown, the cellular base station may be equipped to communicate with a network 108 (e.g., a core network of a cellular service provider, a telecommunication network such as a public switched telephone network (PSTN), and/or the Internet, among various possibilities). Thus, the base station 104 may facilitate communication between UEs 106 and/or between the UEs 106 and the network 108. In particular, the cellular base station 104 may provide UEs 106 with various telecommunication capabilities, such as voice, SMS, and/or data services.

In some cases cellular operators may implement traffic offloading and interworking mechanisms between cellular and WLAN. Using such mechanisms, cellular network operators may be able to offload part or all of a UE's cellular (e.g., LTE/UMTS) data flows to and from those cellular network operators WEAN access points. Note that in at least some instances (e.g., in order to preserve service continuity), the IP address of the WLAN interface may be the same as used for the cellular connection for cellular/WLAN interworking/offloading scenarios.

Thus, although in some instances cellular base station 104 and access point 102 may provide connections to different networks (e.g., network 108 vs. network 100, as shown), in some instances, cellular base station 104 and access point 102 may provide connections to the same network. For example, access point 102 might be an access point deployed by a cellular service provider to supplement their cellular network and provide the capability to offload some cellular data communications to the access point, and might also provide a connection to network 108, which might be a core network of that cellular service provider.

A UE 106 may be capable of communicating using multiple wireless communication standards. For example, a UE 106 may be configured to communicate using at least one wireless networking protocol (e.g., Wi-Fi) and at least one cellular communication protocol (e.g., GSM, UMTS (WCDMA), LTE, LTE-Advanced (LTE-A), 3GPP2 CDMA2000 (e.g., 1×RTT, 1×EV-DO, HRPD, eHRPD), etc.). A UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates a UE device 106 (e.g., UE device 106A illustrated in FIG. 1) in communication with the access point 102. The UE 106 may be a device with wireless network connectivity such as a mobile phone, a hand-held device, a computer or a tablet, or virtually any type of wireless device.

The UE 106 may include a processor that is configured to execute program instructions stored in memory. The UE 106 may perform any of the methods embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may be configured to communicate using any of multiple wireless communication protocols. For example, the UE 106 may be configured to communicate using two or more of GSM, UMTS, CDMA2000, LTE, LTE-A, Wi-Fi, or GNSS. Other combinations of wireless communication standards are also possible.

The UE 106 may include one or more antennas for communicating using one or more wireless communication protocols or technologies. In one embodiment, the UE 106 might be configured to communicate using either of multiple wireless communication technologies using a single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
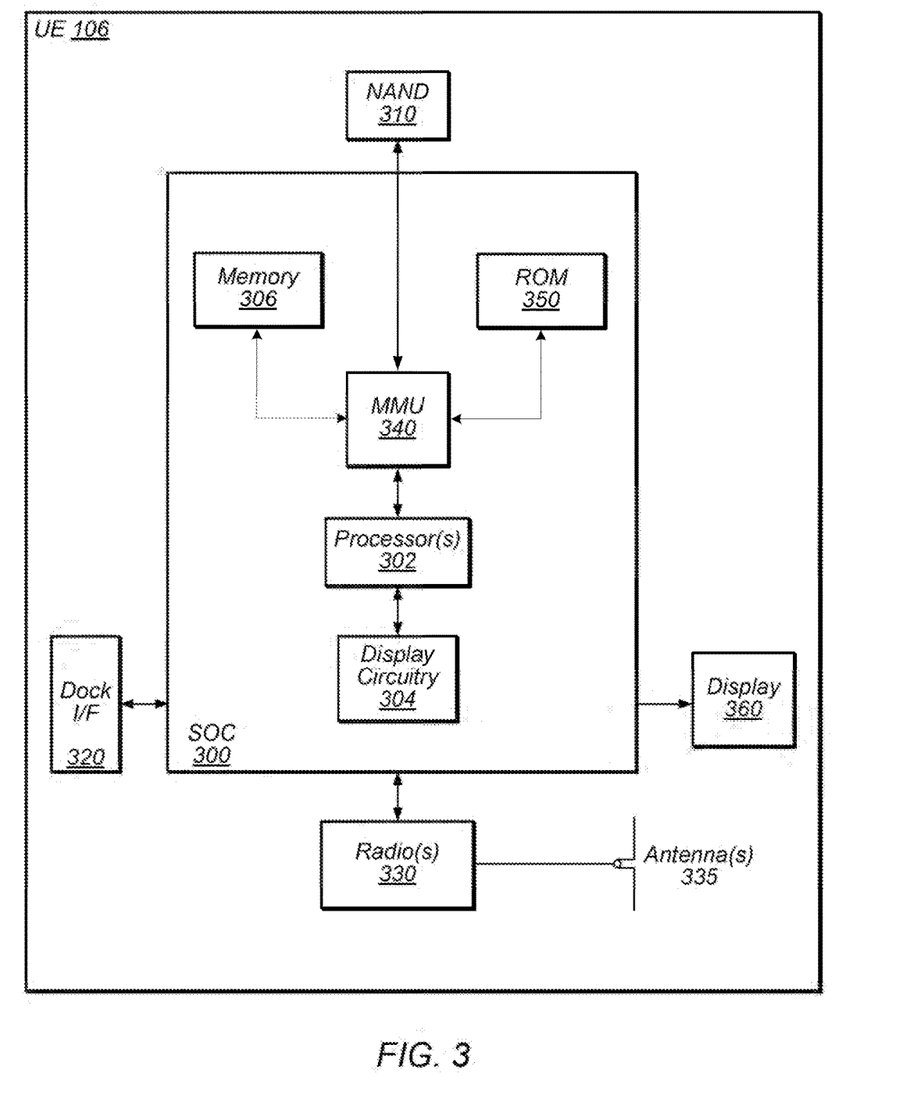
FIG. 3 illustrates an exemplary block diagram of a UE device.

FIG. 3—Exemplary Block Diagram of a UE

FIG. 3 illustrates an exemplary block diagram of a UE 106. As shown, the UE may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330 (e.g., including one or more radios), connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and radio(s) 330 (e.g., for LTE, LTE-A, CDMA2000, Bluetooth, Wi-Fi, GPS, etc.).

As noted above, the UE 106 may be configured to communicate wirelessly using multiple wireless communication standards. As further noted above, in such instances, the wireless communication circuitry (radio(s)) 330 may include radio components which are shared between multiple wireless communication standards and/or radio components which are configured exclusively for use according to a single wireless communication standard. As shown, the UE device 106 may include at least one antenna (and possibly multiple antennas, e.g., for MIMO and/or for implementing different wireless communication technologies, among various possibilities), for performing wireless communication with base stations, access points, and/or other devices. For example, the UE device 106 may use antenna(s) 335 to perform the wireless communication.

The UE 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving/interpreting user input.

The UE 106 may include hardware and software components for implementing the features described herein. The processor 302 of the UE device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein.

Figure 4:
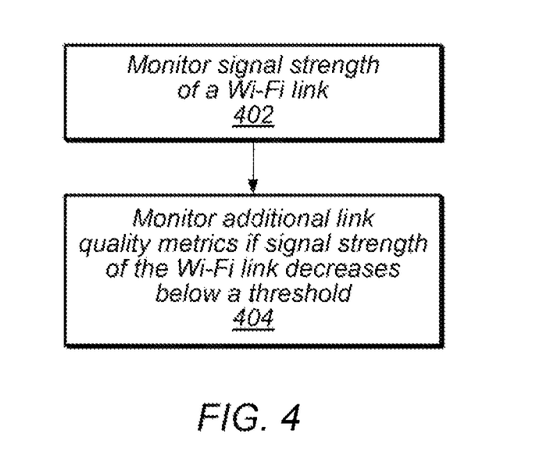
FIG. 4 is a flowchart diagram illustrating an exemplary method for monitoring Wi-Fi link health in a wireless device.

FIG. 4—Flowchart

Depending on various factors, the link quality of a Wi-Fi communication link between a wireless device (e.g., a STA or UE) and a wireless access point (AP) may change over time. Changing RF conditions caused by differences over time in physical distance, multipath, interference, noise, and/or other factors may affect signal strength and the ability of a wireless device to communicate via the Wi-Fi communication link. If not closely monitored, it may be possible (at least in some circumstances) for a wireless device to be 'stuck' on a Wi-Fi network which appears on at least some bases to be usable to the wireless device, but which in fact is not usable by the wireless device. For example, as a wireless device moves towards the edge of the range of a Wi-Fi network, in some cases the device may continue to be able to receive beacons from the Wi-Fi network and accordingly continue to consider the Wi-Fi network acceptable, even though the link quality may not be sufficient at such a distance for exchanging data.

Effective Wi-Fi link monitoring may thus be critical to ensuring the reliability of a Wi-Fi network interface. Such monitoring may be important both in scenarios of active data exchange and (at least in some instances) also at times of inactivity such as when an application processor of the wireless device is in a low power state (e.g., asleep). For example, in certain situations, a wireless device may be set up to receive 'push' notifications which cause the device to become active or 'wake up' if it is in a low power mode or 'sleeping' via a network interface of the wireless device. As one such example, it may be desirable for a wireless device to be able to reliably receive notifications of incoming voice or video calls, even if the device is in a sleep mode when such a call is initiated by the calling party.

For an application for which such 'push' user notification capability is enabled, in order to be able to configure Wi-Fi as a primary network interface and still expect to reliably receive such notifications while in a low power state, an effective link quality monitoring technique may be required in order to confirm that the Wi-Fi link remains a reliable network interface while Wi-Fi is configured as the primary network interface, and in order to trigger a switch to an alternate network interface as the primary network interface for receiving such push notifications if the Wi-Fi link becomes unreliable.

Accordingly, certain techniques described in the present disclosure relate to methods for a UE device to monitor Wi-Fi link health, including techniques which may be used while actively exchanging data and techniques which may be used while in a low-power (e.g., sleeping) state. FIG. 4 is a flowchart diagram illustrating such a method. The method shown in FIG. 4 may be used in conjunction with any of the computer systems or devices shown in the above Figures, among other devices. If desired, it may be the case that the method is more particularly implemented by a WLAN/Wi-Fi chipset within a UE device. Some of the method elements shown may be performed concurrently, in a different order than shown, or may be omitted. Additional method elements may also be performed as desired. As shown, the method may operate as follows.

In 402, signal strength of a Wi-Fi link may be monitored. The Wi-Fi link may be established between a UE and an AP; for example the UE may have joined a Wi-Fi network provided by the AP, and may be a member of the basic service set (BSS) serviced by the AP.

Monitoring signal strength of the Wi-Fi link may include determining a received signal strength indicator (RSSI) value of signals received over the Wi-Fi link, such as Wi-Fi beacons received from the AP. RSSI values over multiple samples may be averaged or filtered (in any of various ways) over a period of time and/or number of samples and a resulting moving average RSSI value may be considered the signal strength of the Wi-Fi link, if desired. Alternatively, an single/instantaneous (e.g., most recent) RSSI value may be used, or the signal strength may be determined in any of various other ways, as desired.

The signal strength of the Wi-Fi link may be used as a first indicator of Wi-Fi link health. For example, if signal strength of the Wi-Fi link is relatively high, the Wi-Fi link may be more likely to be in good health and be reliable than if the signal strength of the Wi-Fi link is relatively low. If desired, one or more thresholds may be used to distinguish between different conditions or states of the Wi-Fi link signal strength. For example, if the RSSI value falls below a certain ("first") threshold, the Wi-Fi link might be considered to be in a "bad RSSI" state, while if the RSSI value rises above that threshold, the Wi-Fi link might be considered to be in a "good RSSI" state. As another example, if the RSSI value falls below the first threshold, the Wi-Fi link might be considered to be in the bad RSSI state, while if the RSSI value rises above a "second" threshold (which may be higher than the first threshold), the Wi-Fi link might be considered to be in the good RSSI state. In such a case hysteresis may occur in the RSSI value range between the first and second thresholds, such that the signal strength condition of the Wi-Fi link when RSSI values fall in that range may depend on whether RSSI values more recently were below the first threshold or above the second threshold. Such a technique may prevent the UE from transitioning between considering the Wi-Fi link to be in the good RSSI state and the bad RSSI state overly frequently.

Note that the manner in which the signal strength of the Wi-Fi link is monitored may depend on the circumstances in which the method is being performed, and possibly additionally or alternatively on a current state of the signal strength of the Wi-Fi link.

As a first possibility, the method may be performed while the UE (e.g., including a host processor of the UE) is active, such as when a user of the UE is actively using the UE for network data exchange (e.g., for email, voice or video calling, web browsing, and/or any of various other possible networking applications). In such a case, network communications may be relatively frequent, so opportunities to measure Wi-Fi link RSSI may be plentiful.

As a second possibility, the method may be performed while part or all of the UE is in a low power (sleeping or idle) state, such as when the UE is not actively being used for network data exchange. For example, while the UE is in standby and not actively being used by a user, a host processor of the UE might be sleeping and a Wi-Fi chipset of the UE might be sleeping except for brief periods of time during which beacons are scheduled, at which times the Wi-Fi chipset may wake up and monitor those beacons. In such a case, network communications may be relatively infrequent; for example, if communications are limited to periodic beacon monitoring, with no network- or other higher-layer data actually being exchanged over the network interface, opportunities to measure Wi-Fi link RSSI may be more limited.

In addition to this difference in manner of measuring RSSI values of the Wi-Fi link relating to frequency and opportunity availability to measure RSSI values, at least in some instances if the UE is in a low power state, beacon monitoring behavior itself may also be modified. Since, as previously noted, RSSI measurements of an idle Wi-Fi link may be relatively infrequent, beacon monitoring behavior may be modified in order to increase the likelihood of receiving those beacons. For example, instead of waking at a scheduled beacon time for beacon monitoring, the Wi-Fi chipset of the UE may wake slightly early (e.g., slightly before the scheduled beacon time), and/or remain awake for a longer duration after the beacon ends, in order to avoid missing part or all of a beacon which is sent by a Wi-Fi AP earlier than scheduled.

Additionally or alternatively, if desired, modifications to signal strength measurement behavior may be made based on recent signal strength measurements, or possibly based on a signal strength state (which may in turn be based on recent signal strength measurements) in which the Wi-Fi link is considered to be. As one such possible modification, signal strength measurements may be made more frequently if recent signal strength measurements indicate a low signal strength of the Wi-Fi link (e.g., if the Wi-Fi link is considered to be in the bad RSSI state previously described), and less frequently if recent signal strength measurements indicate a high signal strength of the Wi-Fi link (e.g., if the Wi-Fi link is considered to be in the good RSSI state previously described). For example, a sleeping UE with an idle Wi-Fi link might dynamically modify it's wake-up frequency for beacon monitoring (and might also modify its delivery traffic indication message (DTIM) interval) to be more frequent when RSSI is lower (e.g., in the bad RSSI state) or to be less frequent when RSSI is higher (e.g., in the good RSSI state). Such a behavior modification may reduce power consumption by the UE in circumstances when the Wi-Fi link is at less risk of becoming unreliable, since for example if RSSIs of a Wi-Fi link are sufficiently high, the Wi-Fi link may typically be reliable.

In 404, additional link quality metrics may be monitored if signal strength of the Wi-Fi link decreases below a threshold. The additional link quality metric monitoring may be triggered by the Wi-Fi signal strength falling below the "first threshold" described above, and may continue while the Wi-Fi signal strength remains below that threshold, or more generally while the Wi-Fi link is in a "bad RSSI" state, until the Wi-Fi link returns to a "good RSSI" state, is disconnected, or is moved to a different AP.

The additional link quality metrics monitored, and possibly the manner in which they are monitored, may also depend on the circumstances in which the method is being performed. For example, more link quality metrics may be available to monitor if the Wi-Fi link is actively being used by one or more networking applications than if the UE is asleep and no higher layer data exchange is occurring over the Wi-Fi link.

As one possible additional link quality metric, the packet error rate of internally generated uplink (transmit) frames such as IPv4 or IPv6 keep-Alives and NULL frames for off channel scans and IEEE power save may be monitored. Such frames may be monitored whether the Wi-Fi link is active or idle, since they may periodically occur even on an idle Wi-Fi link.

As another possible link quality metric, beacon reception success rate may be monitored. Such monitoring may also be performed regardless of whether the Wi-Fi link is active or idle, since beacon monitoring may be performed both on idle and actively used Wi-Fi links.

If the Wi-Fi link is active, it may additionally or alternatively be possible to monitor any of a variety of additional link quality metrics or statistics from various network stack layers relating to data exchange (or attempted data exchange). For example, data transmission failures at media access control (MAC), gateway address resolution protocol (ARP) renewal failures, transmission control protocol (TCP) socket establishment failures, and/or TCP timeouts may be monitored.

Monitoring the additional link quality metric(s) may include determining whether or not each metric (or combinations of metrics) meets certain thresholds or conditions indicative of poor Wi-Fi link health (or if desired, alternately defined thresholds or conditions indicative of good Wi-Fi link health). For example, if uplink PER exceeds a certain threshold (possibly with an activity requirement), or beacon loss exceeds a certain (e.g., similar or different) threshold, or a certain (e.g., predetermined) number of DNS failures, TCP socket establishment failures, or gateway ARP renewal failures occur, this may be a trigger or indicator of poor Wi-Fi link health.

In some instances the Wi-Fi link may be actively probed by the UE, either as part of the additional link quality metric monitoring, or as a further step if monitoring the additional link quality metric(s) indicates the Wi-Fi link may be in poor health. Actively probing the Wi-Fi link may include inducing traffic on the Wi-Fi interface (e.g., a gateway ARP request or ping probe) to further assess the quality of the Wi-Fi link.

If it is determined (e.g., based on signal strength monitoring, additional link quality metric monitoring, and/or link probing) that the Wi-Fi link is not reliable, action may be taken to improve the quality of the Wi-Fi link and/or configure an alternate network interface as a primary network interface. As with other previously described aspects of the method, the action taken may in such a situation may depend on the circumstances in which the UE is at that time.

As one possibility, an attempt may be made to 'roam' to another Wi-Fi network. For example, if one or more other Wi-Fi APs are available within communicative range of the UE, at attempt may be made to roam to one of those APs. If successful, this may result in the UE joining a Wi-Fi network provided by such an alternate AP, which may improve the quality of the Wi-Fi link of the UE.

As another possibility, for example if no alternate Wi-Fi AP candidates are available, or if roaming is unsuccessful, the Wi-Fi link may be disconnected. Additionally, if desired, the Wi-Fi network which was deemed unreliable may be at least temporarily blacklisted (e.g., prevented from auto join candidacy). Such blacklisting may automatically expire after a predetermined amount of time, or may be cancelled if signal strength increases above a certain threshold (e.g., the "second threshold" described above, as might be indicative of a "good RSSI" state). This may help prevent the UE from immediately returning to the same problematic network unless conditions have markedly improved.

As a still further possibility, if the UE is asleep and the Wi-Fi link is idle, the Wi-Fi chipset may provide an indication or alert (e.g., a 'wake-up' alert) to a host processor of the UE. The host processor may then wake up and modify it's network interface configuration. For example, if available, a cellular network interface may be designated the primary network interface (e.g., such that any incoming push notifications may be routed to the UE by way of that network interface) instead of the Wi-Fi network interface, since the Wi-Fi network interface may have been determined to be unreliable.

Note that in some instances, idle-mode Wi-Fi link monitoring by the Wi-Fi chipset of a UE while the host processor of the UE is asleep for reliability and/or providing notifications to the host processor by the Wi-Fi chipset in response to determining that the Wi-Fi link has become unreliable may be selectively implemented by the host processor. For example, such monitoring and notifications as described herein above with respect to FIG. 4 may be performed in response to an indication from the host processor to the Wi-Fi chipset to notify the host processor if the Wi-Fi link is not reliable, which the host processor may provide prior to going to sleep. The host processor might provide such an indication based on a request or configuration setting relating to one or more applications which want reliable wake-on-wireless based on push notification capability.

Figure 5:
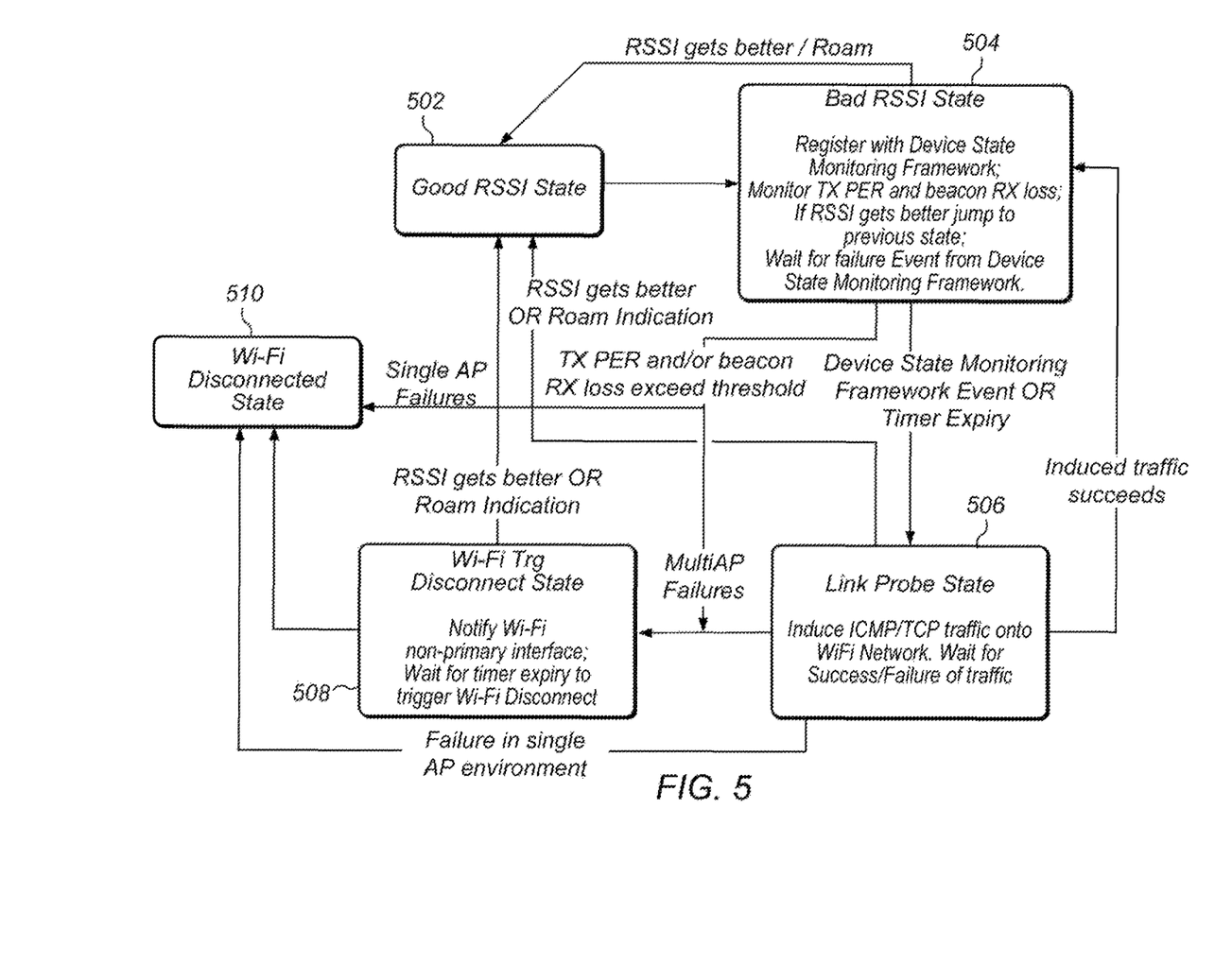
FIG. 5 is an state diagram illustrating aspects of an exemplary method for monitoring link health of an active Wi-Fi link.
Figure 6:
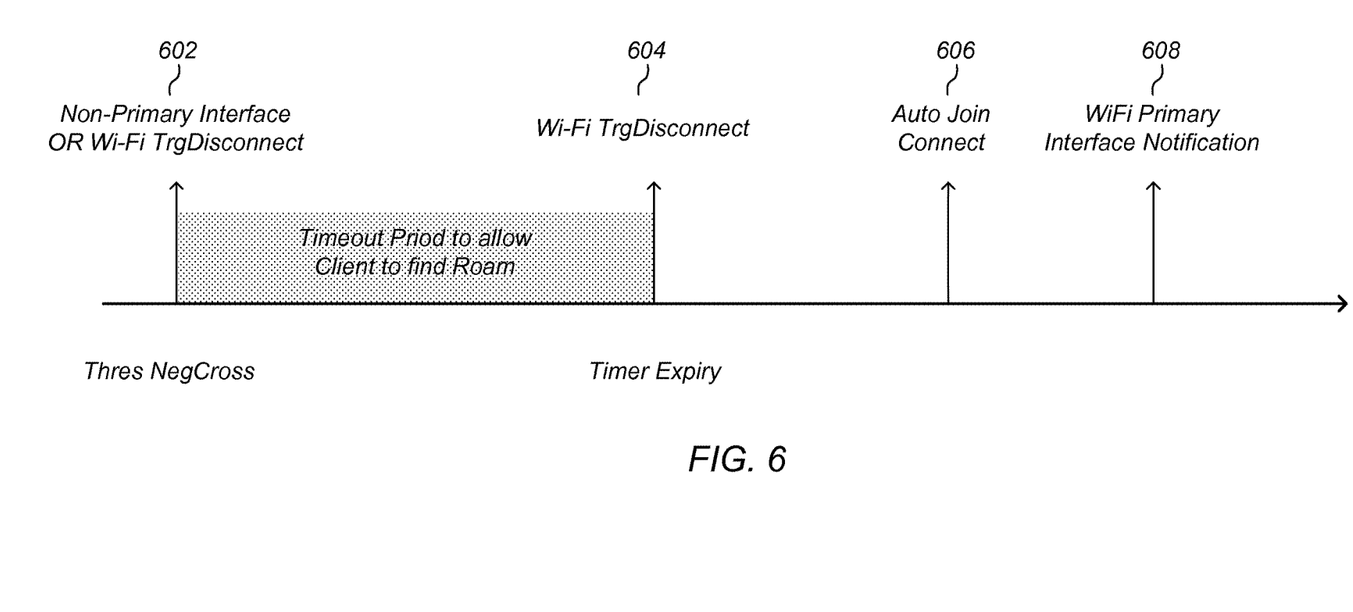
FIG. 6 illustrates an exemplary portion of a triggered disconnect temporal sequence of events.

FIGS. 5-6—Active Wi-Fi Link Monitoring and Wi-Fi Disconnection Triggering

FIG. 5 is a state diagram illustrating aspects of an exemplary method for monitoring link health of an active Wi-Fi link. FIG. 6 illustrates an exemplary portion of a Wi-Fi triggered disconnect temporal sequence of events such as might occur according to the method of FIG. 5. Note that FIGS. 5-6 and the description thereof are provided by way of example of one possible set of more specific implementation details of the method of FIG. 4, and are not intended to be limiting to the disclosure as a whole. Numerous alternatives to and variations of the details provided hereinbelow are possible and should be considered within the scope of the present disclosure.

As previously noted, it may sometimes be the case that link quality of a Wi-Fi link degrades to a level where the Wi-Fi link may not be usable for exchanging data, but the link may nonetheless not be torn down, for example since beacons may still be received. This may commonly be referred to as the 'parking lot problem', as it may frequently occur towards the outer limits of a Wi-Fi network, such as in the parking lot of an establishment/location at which the Wi-Fi network is based.

The link monitoring techniques illustrated in FIG. 5 may be used to detect such situations, tear down the connection to the problematic Wi-Fi network, and roam to an alternate Wi-Fi network if possible and/or switch to an alternate network interface such as a cellular network interface to exchange network data. Part or all of the method of FIG. 5 may be implemented by a "LinkQualityAssessment (LQA) Manager" module on a Wi-Fi chipset of a UE, if desired.

As shown, the Wi-Fi link may initially be considered to be in a good RSSI state 502.

If RSSI of the Wi-Fi link falls below a certain threshold (e.g., −80 dBm, or a different threshold if desired), the algorithm may transition to a bad RSSI state 504. In this state various network use statistics may be monitored. A 'device state monitoring framework' module (e.g., a module executing on a host processor of the UE configured to monitor various aspects of UE operation) may monitor data flow activity on the Wi-Fi network interface (and possibly other aspects of operation of the UE device); when in the bad RSSI state 504, the LQA manager may register with the device state monitoring framework module for notifications of certain network stack failure events relating to these network use statistics. Examples of such event definitions/signatures are provided herein below.

The LQA manager may also monitor lower layer (e.g., MAC) statistics (e.g., transmit failure for host generated frames and firmware generated frames, and also Beacon loss on MAC). If these exceed thresholds then LQA manager may transition to a Wi-Fi Triggered Disconnect State 508 in a Multi-AP environment, or transition directly to a Wi-Fi Disconnected State 510 in a single AP environment. Alternatively, such conditions may trigger a transition to a Link Probe State 506, if desired. If these statistics are good (e.g., don't exceed configured thresholds), then the LQA may wait in the bad RSSI state 504 for any notifications from the device state monitoring framework, improvements in RSSI or roaming occurring (in which case a transition back to the good RSSI state 502 may occur), or deterioration of the MAC statistics.

Upon reception of event from the device state monitoring framework, it may be determined when the last time the Wi-Fi link was probed (by self inducing traffic) with positive results. If the time delta between the current event and last probe is greater than a threshold (e.g., a threshold on the order of seconds to ensure minimal artificial traffic on the wireless medium, or any other threshold as desired) then the Wi-Fi link may be transitioned to the Link Probe State 506.

In the Link Probe State 506, Wi-Fi traffic (e.g., ping packets with 1500 bytes payload as one example, or any of various other types of induced traffic) may be induced onto the Wi-Fi interface, which may then be monitored for a response.

Self induced packet statistics may be used in assessing the Wi-Fi link as a supplemental feature which may help avoid false failure detections which may be caused by just using RSSI values for decision making in the absence of active transmit (TX) and receive (RX) traffic. In other words, inducing packets onto the medium may serve to generate active TX traffic, whose success or failure may then be used to assess the quality of the Wi-Fi link. Such self induced packets may also provide an indirect measure of RX link assessment, which may not otherwise be possible from Wi-Fi receiver side. The self induced packets may be generated with the size which resembles data flow, if desired, which may provide a higher level of confidence for correlating the transmission successes of self induced packets with actual data flow.

The self induced packets may include a ping to a gateway over the Wi-Fi interface in order to induce packets on the wireless medium both on RX and TX. If there are ping timeouts, and the number of such timeouts crosses a threshold, then a Wi-Fi triggered disconnect may be initiated. Or more generally, if there is greater than a threshold number of failures on the induced traffic in the link probe state 506, the state machine may advance to a Wi-Fi Triggered Disconnect State 508 when if the UE is in a Multi-AP environment (e.g., if there is at least one alternate AP candidate).

If the pings succeed and RSSI stays at same level (doesn't get better) or worse then the link may be probed again periodically (e.g., on the order of 5-10 secs, or with any other desired periodicity).

In the Wi-Fi Triggered Disconnect State 508, the Core Network may be notified that the Wi-Fi network interface is not a primary network interface of the UE. In this case, all new sockets established after this notification may be on a Cellular or other alternate network interface. Additionally, already established sockets based on TCP retries or timeouts may be re-established over the Cellular (or other) network interface.

Also in Wi-Fi Triggered Disconnect State 508, a timer for Wi-Fi triggered disconnect may be started. The timeout period of this timer may be used to attempt to find a Roam candidate. If roaming does not occur during this timeout period (i.e., the timer expires), disconnect will be triggered and the state machine may transition to a Wi-Fi Disconnected State 510. In other words, the Wi-Fi link may be disconnected or torn down.

Note that in Single AP environment, failures on induced traffic in the Link Probe State 506 may immediately trigger Wi-Fi disconnection and move the state directly to the Wi-Fi Disconnected State 510. The network may be blacklisted, and may not be picked by Auto Join until the network positively crosses the RSSI threshold by certain Delta RSSI, for example to avoid "ping-ponging" between bad networks.

When RSSI does positively cross the good RSSI threshold (e.g., from Scan results), Auto Join may associate to the network, and the LQA manager may be moved back to the Good RSSI State 502.

Note that if RSSI improves sufficiently (i.e., positively crosses the good RSSI threshold) from any of the Bad RSSI State 504, the Link Probe State 506, or the Wi-Fi Triggered Disconnect State 508, or if roaming occurs while in any of these states, the LQA manager may also transition back to the Good RSSI State 502.

Thus, the method of FIG. 5 may provide techniques for monitoring Wi-Fi link quality and triggering disconnection of a failing or failed Wi-Fi link. FIG. 6 illustrates an exemplary portion of a Wi-Fi triggered disconnect temporal sequence of events such as might occur according to the method of FIG. 5, for example in a multiple AP environment.

As previously noted, in a single AP environment, there are no roam candidates which can be found. Hence in single AP environment, upon negative crossing one or more thresholds indicative of Wi-Fi link failure, there may be a Wi-Fi triggered disconnect which will tear down the WiFi link.

In a multiple AP environment, however, some time may be provided for roam logic to initiate and find Roam candidates. Hence, in such a situation, upon negative crossing one or more thresholds indicative of Wi-Fi link failure, in 602 an indication may be provided to System Configuration to make Wi-Fi a "non-primary interface" and initiate or 'arm' a timer with a configured timeout for Roam logic to find a preferred roam candidate and roam to it. Thus, if successful roaming occurs in the illustrated shaded 'timeout period', the timer may be stopped or 'killed'. If no roam occurred, however, then upon timer expiry at 604 a disconnection from that AP may be triggered, as illustrated.

After Wi-Fi disconnection, in 606 an Auto Join module may attempt to find an AP candidate with which to associate and initiate the association process, as illustrated. After the association completes, in 608 a Wi-Fi Manager may indicate back to System Configuration that Wi-Fi is again a primary interface. Alternatively, a WLAN interface up notification from a WLAN Driver may implicitly make Wi-Fi as a primary interface, if desired.

As previously noted, a variety of possible thresholds, conditions, and failure event signatures may be defined and used in the method of FIG. 5, as desired. The following section provides some examples of such thresholds, conditions, and failure event signatures.

Average RSSI calculated from the beacons received from the AP by the UE may be used to transition the state of LQA Manager, as one possibility. Since RSSI is calculated over the beacons from the AP, this may provide an assessment of the Receive link quality. As one possibility, RSSI negative crossing of −80 dBm may be used to transition the state of LQA Manager from the Good RSSI State to the Bad RSSI State. A 5 dBm hysteresis (or alternatively, a −75 dBm positive crossing) may be used to prevent ping-ponging between the Good RSSI State and the Bad RSSI State when RSSI values are close to the threshold.

Packet error rate (PER) may be used as another state transition trigger. This signature may quantify the transmit (TX) link quality. As one example, while in the bad RSSI state 504, the LQA Manager may compute the number of TX Frames, the number of TX failures, and the number of TX retries in the last 15 sec interval (which may represent 3 statistic query periods, if desired). If the number of TX Frames is greater than or equal to five, and the number of retransmissions is five times the number of TX frames or more, and packet loss is 50% or greater, this may be one possible Wi-Fi link failure signature which may cause a transition to the link probe state 506 or a forced Wi-Fi disconnect (e.g., transition to Wi-Fi Triggered Disconnnect state 508 or Wi-Fi Disconnected State 510 depending on whether in a single AP or multi-AP environment) according to the method of FIG. 5. Note that either or both of TX PER for host-generated and firmware-generated frames (e.g., housekeeping frames between the UE and the AP) may be used as a state transition trigger, as desired. TX PER for host-generated frames and TX PER for firmware-generated frames may be computed together or separately, and in similar or different manners, as desired. Other TX PER related failure signatures may also or alternatively be used if desired.

The number of beacons received by the UE may be indicative of the quality of the link on the receive side. Accordingly, beacon packet loss rate may also be taken into consideration (e.g., monitored while in the bad RSSI state 504) and possibly used as a state transition trigger. For example, as one possibility, a beacon packet loss rate of 90% or higher may be considered to be indicative of a poor receive link, and may be one possible Wi-Fi link failure signature which may cause a transition to the link probe state 506 or a forced Wi-Fi disconnect (e.g., transition to Wi-Fi Triggered Disconnnect state 508 or Wi-Fi Disconnected State 510 depending on whether in a single AP or multi-AP environment) according to the method of FIG. 5. Other beacon packet loss related failure signatures may also or alternatively be used if desired.

As previously noted, higher layer Wi-Fi link failure signatures may also be defined and used to generate events/notifications to the LQA manager module by the device state monitoring framework module. Some such possible events may be as follows.

As one possibility, gateway ARP failure may be an event indicative of Wi-Fi link failure. Gateway ARP failure may be a failure on the UE side such that the UE is unable to establish an ARP entry for the gateway. Network traffic may not be able to start with ARP failure. In this case, the UE may self induce ping packets to try to resolve the MAC address of the gateway, and if this does not succeed the pings also will fail. It should be noted that (at least in some instances) the device state monitoring framework may passively observe such activity on the network stack, and may not itself emit such probes.

As another possibility, if the number of sockets failed exceeds a threshold (e.g., two, three, five, ten, or any other threshold as desired) then a failure event may be generated.

As a further possibility, if a number of timeouts greater than a certain threshold (which again may be defined as desired) are experienced in receiving TCP acknowledgements for transmitted packets, and/or application timeouts are experienced in receiving any downlink data, then a failure event may be generated.

As a still further possibility, if DNS address resolving fails a threshold number of times, then a failure event may be generated.

Note that if desired, the device state monitoring framework may provide an API for its client (e.g., the LQA manager, as one possibility) to dynamically update and tune any or all of the thresholds, timeout values, etc. used to define failure events.

Figure 7:
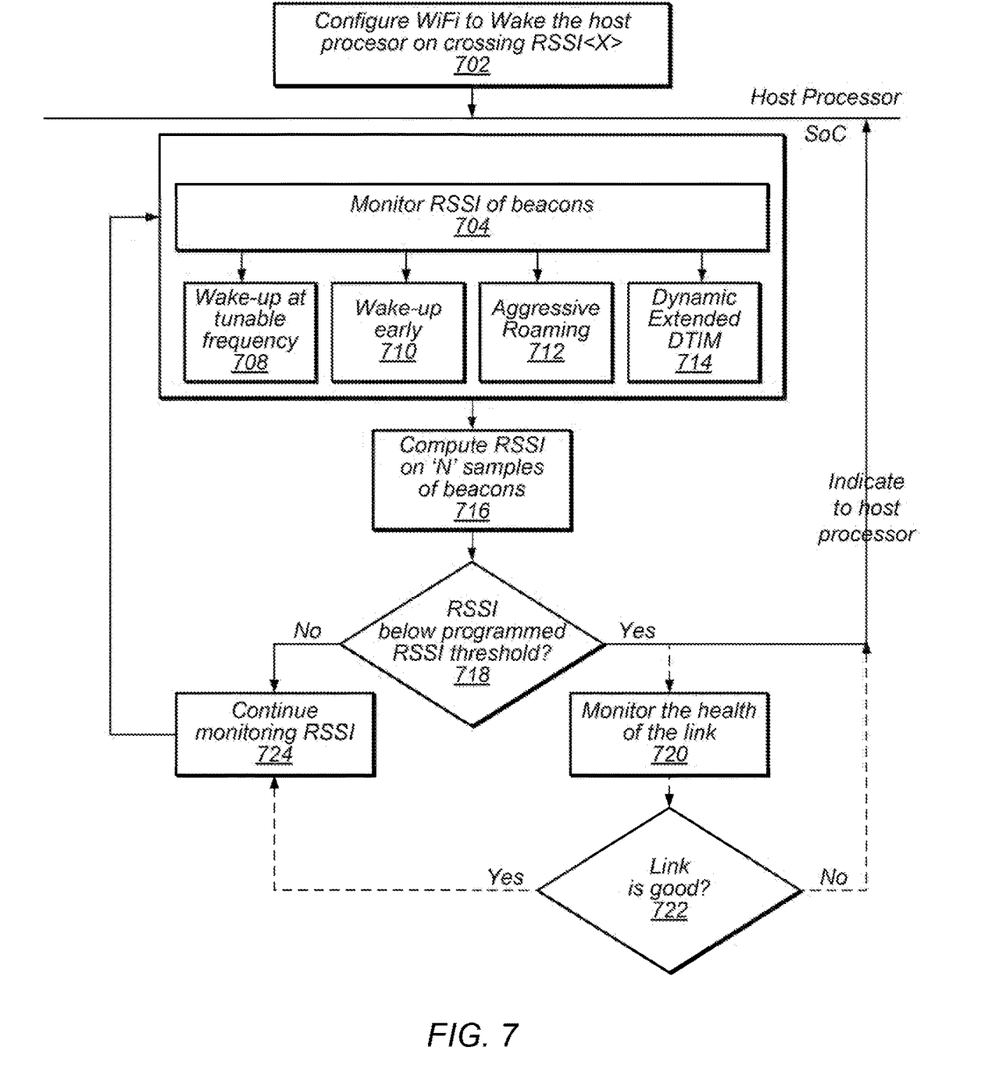
FIGS. 7-8 are flowchart diagrams illustrating aspects of an exemplary method for a wireless device to monitor link health of a Wi-Fi link while the wireless device is in a low-power state.
Figure 8:
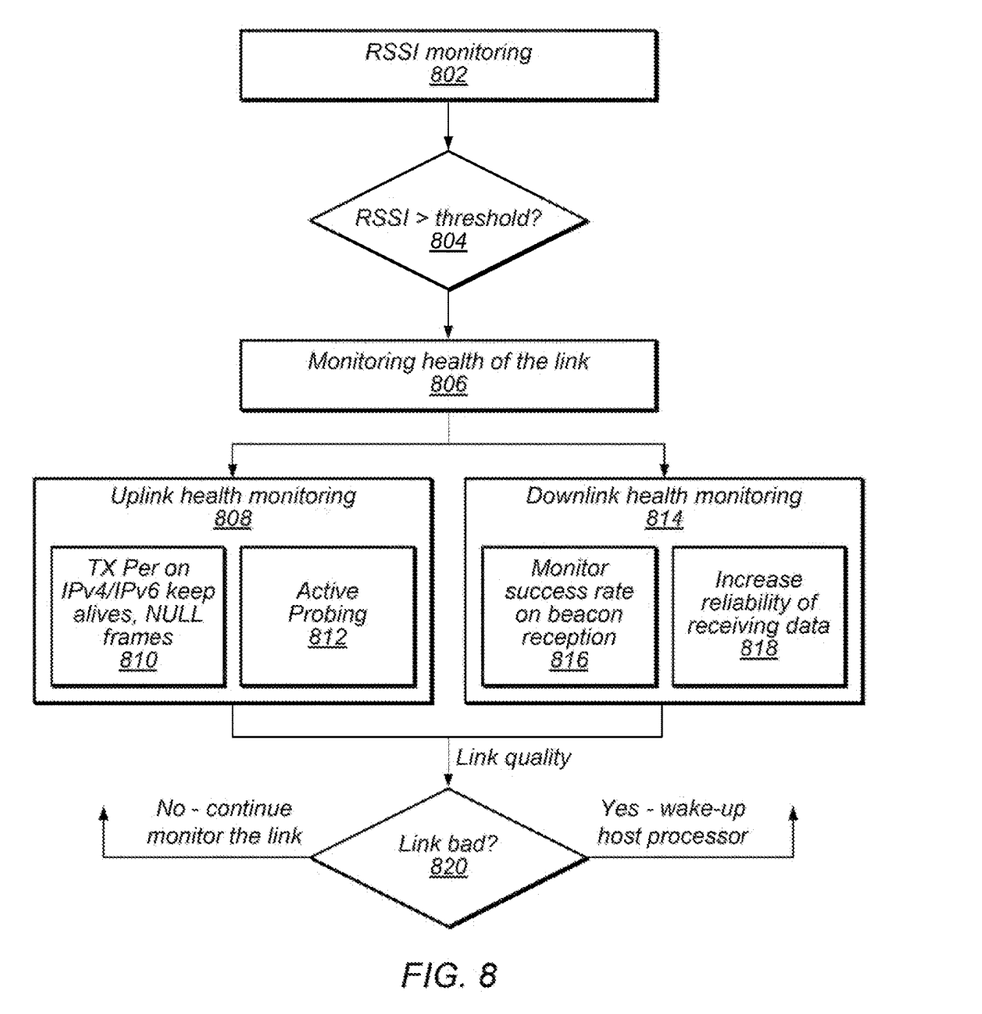

FIGS. 7-8—Idle Wi-Fi Link Monitoring

FIGS. 7-8 are flowchart diagrams illustrating aspects of an exemplary method for a wireless device to monitor link health of a Wi-Fi link while the wireless device is in a low-power state. Note that FIGS. 7-8 and the description thereof are provided by way of example of one possible set of more specific implementation details of the method of FIG. 4, and are not intended to be limiting to the disclosure as a whole. Numerous alternatives to and variations of the details provided hereinbelow are possible and should be considered within the scope of the present disclosure.

Wi-Fi link may typically provide a best effort type link with regards to data exchange. However, it may be typical for many mobile applications to establish sockets and exchange data over a device's Wi-Fi interface, for example to prevent metered costs sometimes associated with cellular data usage.

When the quality of a Wi-Fi link being used for such data exchange degrades or when the Wi-Fi link looses connectivity, the mobile applications may re-establish sockets on a Cellular or other network interface in order to maintain or re-establish network connectivity (e.g., with their application server(s)). While awake, this may happen by monitoring the statistics at various level of network stack, such as described herein above with respect to FIGS. 5-6, or in any of various other ways. However, when a wireless device is sleeping (or in an idle mode), network layer statistics may not be present. So sockets which are established over a Wi-Fi link when link quality is good (and the device is awake) may continue to remain on the Wi-Fi link even if link quality degrades when the device enters the sleep or idle mode. This may affect the timely delivery of push notifications; for example, if a ("second") user of a different device attempts to initiate a call or otherwise contact a ("first") user of the device in this state, the attempt would fail since the push notification of the call would be performed over the failed or otherwise poor-quality Wi-Fi link, and the second user would not be able to reach the first user. Such a state may persist until Wi-Fi link is eventually disconnected, torn down, or improved.

Accordingly, the method of FIGS. 7-8 may be used to provide link quality assessment logic (e.g., a module on a Wi-Fi chipset of a UE, similar to or different from the LQA manager module described with respect to the method of FIG. 5) for when a UE is in sleep mode. When this logic detects that a Wi-Fi link is less reliable it may indicate as much to the Application (host) processor of the UE, based on which mobile applications may re-establish their sockets over a Cellular or other interface. Likewise, when the WiFi link is more reliable the logic may again indicate as much to the Application processor and the sockets may be re-established over the Wi-Fi interface.

In this scenario, as the link may be idle with respect to network layer, the link quality assessment may be based on the frames which the Wi-Fi chipset locally exchanges with the Wi-Fi AP. The methods of FIGS. 7-8 provide such a way to detect that a Wi-Fi link is unreliable and to improve reliability of the Wi-Fi link under low signal strength scenarios.

In idle mode (e.g., when a host processor of the UE is sleeping and an IKEv2 tunnel is established over Wi-Fi to receive incoming voice call and/or other push notifications), there may be limited TX/RS activity, and the Wi-Fi chipset may be configured to wake up periodically (e.g., once every 900 ms) to receive beacons, which may in turn be used to update RSSI and monitor incoming traffic.

Limited data traffic and signal strength fluctuations may make Wi-Fi link quality monitoring in idle mode particularly challenging. If Wi-Fi link quality degrades, it may be desirable to switch to an alternate (e.g., more reliable) network interface such as a cellular network interface to place/receive calls.

Accordingly, in 702, the host processor of the UE may include the Wi-Fi chip/chipset/SoC to wake the host processor on the Wi-Fi link crossing a certain RSSI threshold. Note that if desired, multiple RSSI thresholds may be set, with different values for positive and negative crossings, for example to establish a hysteresis.

In 704, beacon RSSIs may be monitored. As previously noted, due to the infrequent nature of idle mode Wi-Fi communications, receiving beacons consistently is very important in order to consistently obtain accurate RSSI values. To make sure that the UE does not miss receiving beacons, beacon monitoring may include any or all of a variety of features.

One such feature may include, in 708, monitoring beacons at a tunable or configurable frequency, which may be higher than would otherwise be used. For example, beacons may be monitored for RSSI every 100 ms or every 300 ms instead of every 900 ms, if desired.

Another such feature may include, in 710, waking up early to capture beacons which are sent by the Wi-Fi AP earlier that the defined beacon interval.

As another possibility, in 712, roaming aggressiveness may be increased, such that the Wi-Fi chipset may actively look for alternative Wi-Fi APs to which the device could roam, that may offer better connectivity, at a modified RSSI level (or based on other factors).

As a further possibility, in 714, the Wi-Fi chipset may coordinate with the Wi-Fi AP to modify a delivery traffic indication message (DTIM) interval for the UE, for example to match (or otherwise be modified in conjunction with) the modified frequency at which beacon monitoring occurs.

Additionally, if desired, both multicast and broadcast beacon data may be monitored, and with relaxed inactivity timeouts, in order to provide the best possibility to receive and obtain accurate RSSI values of beacons.

Based on this beacon monitoring behavior, in 716 Wi-Fi link RSSI may be computed by averaging RSSI over a certain number 'N' of beacons. The number 'N' may be any desired number, and may depend for example on the desired averaging window and the frequency of beacon monitoring, among possible considerations.

In 718, it may be determined whether the computed RSSI is below the programmed RSSI threshold. If it is not, in 724 RSSI monitoring may continue, and the method may return to step 704. If the computed RSSI is below the programmed RSSI threshold, however, an indication may be provided to the host processor that the Wi-Fi link RSSI has fallen below the RSSI threshold.

Alternatively (as indicated by the dashed lines), an additional Wi-Fi link health monitoring process may be performed in 720 if the RSSI is below the programmed RSSI threshold, if desired. An exemplary such process is illustrated in and described further with respect to FIG. 8. The process may make a more precise determination as to whether or not the Wi-Fi link is healthy. If it is determined at decision 722 that the Wi-Fi link is still good (even though RSSI is relatively low), the method may continue to monitor RSSI without immediately notifying the host processor. If however it is determined at decision 722 that the Wi-Fi link has become unreliable and is not still good, the host processor may be notified of the poor condition of the Wi-Fi link health. Based on this an IKEv2 tunnel or other mechanism for receiving incoming call notifications may be established over a cellular or other network interface.

Note that in some instances, if RSSI is very good, the Wi-Fi chipset may be configured to reduce waking frequency, reduce monitoring frequency for incoming data, and/or reduce roaming aggressiveness. The host processor may be alerted in such a case (e.g., if Wi-Fi is not already the primary interface) so that applications may re-configure their sockets to utilize the reliable Wi-Fi interface. The threshold may be set such that RSSI fluctuations don't cause repeated host processor wakes and ping-pongs between wifi and cellular, and to add hysteresis. For example, the RSSI threshold for which positive crossing triggers notification and configuration of the Wi-Fi interface for use as a primary network interface might be −60 dBm, while the RSSI threshold for which negative crossing triggers notification and configuration of the Wi-Fi interface to no longer be a primary network interface might be −80 dBm. Other thresholds (with similar or different deltas between) may also be used as desired.

As noted above, FIG. 8 illustrates further details of additional link health monitoring techniques which may be used to monitor an idle Wi-Fi link. As illustrated, the method of FIG. 8 may include RSSI monitoring in 802 and determining whether or not RSSI of the Wi-Fi link is below a certain threshold in 804, which may be implemented in a similar manner as described with respect to steps 704 and 718 (respectively) of FIG. 7.

In 806, monitoring health of the link (which may correspond to step 720 illustrated in FIG. 7) may be subdivided into uplink health monitoring 808 and downlink health monitoring 814. Either or both may be used, as desired, as part of monitoring health of the link in 806.

Uplink health monitoring 808 may include, in 810, monitoring TX PER of internally generated frames (e.g., IPv4/IPv6 keep-Alives, NULL frames for off channel scans and IEEE power save). If PER exceeds a configured threshold (80%, for instance, or any other threshold), this may be defined as an indicator of poor link health.

Uplink health monitoring 808 may also or alternatively include, in 812, actively proving the Wi-Fi link. For example, the Wi-Fi chip may periodically send a ARP or ping probe to assess the quality of Wi-Fi link. If the expected responses (or a certain configured proportion of expected responses) are not received, this may be defined as an indicator of poor link health.

Downlink health monitoring 814 may include, in 816, monitoring the success rate of receiving expected beacons. For example, if success rate falls below a configured threshold (e.g., 80%, for instance, or any other threshold), this may be defined as an indicator of poor link health.

Downlink health monitoring 814 may also or alternatively include, in 818, increasing the reliability of receiving data. This may include configuring the chip wake-up times in such a way that it can receive data in most noisy conditions; for example, by waking up early for expected beacons as previously described, and/or by remaining awake with a longer time-out period (e.g., 15 ms instead of 10 ms) to ensure the Wi-Fi chipset has the best possible chance of receiving downlink beacons.

In 820 (similar to decision 722 of FIG. 7), if any or all indicators monitored as part of the link health monitoring indicate that the link is bad/poor/unreliable, the Wi-Fi chipset may alert the host processor, while if all of the indicators monitored as part of the link health monitoring indicate that the link is not bad/poor/unreliable, the Wi-Fi chipset may continue to monitor the link (e.g., including RSSI monitoring, monitoring other link health metrics, or both).

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for a wireless device to monitor Wi-Fi link quality, the method comprising:
   establishing a Wi-Fi link;
   monitoring RSSI of the Wi-Fi link;
   determining that RSSI of the Wi-Fi link has fallen below a first RSSI threshold based on monitoring RSSI of the Wi-Fi link;
   enabling monitoring a plurality of link quality metrics other than RSSI based on determining that RSSI of the Wi-Fi link fell below the first RSSI threshold;
   determining that a potential link failure event has occurred based on monitoring the plurality of link quality metrics;
   inducing traffic on the Wi-Fi link in response to determining that a potential link failure event has occurred based on monitoring the plurality of link quality metrics;
   determining a failure rate of the induced traffic; and triggering, if the failure rate of the induced traffic is higher than a failure rate threshold, a disconnection of the Wi-Fi link.

2. The method of claim 1, wherein the plurality of link quality metrics comprise two or more metrics selected from the group of:
    transmit failures at a media access control (MAC) layer;
    beacon losses at the MAC layer;
    firmware-generated packet losses at the MAC layer;
    gateway address resolution protocol (ARP) renewal failures;
    domain name resolution failures;
    transmission control protocol (TCP) socket establishment failures; and
    TCP timeouts.

3. The method of claim 1,
    wherein a plurality of potential link failure events are defined at the UE based on the plurality of link quality metrics.

4. The method of claim 3, wherein the plurality of potential link failure events comprise at least one of:
    a transmit packet error rate (PER) higher than a first PER threshold over a first period of time for at least a frame threshold number of transmit frames for MAC and/or firmware-generated packets;
    a beacon packet loss rate higher than a beacon packet loss rate threshold;
    gateway ARP failure;
    greater than a socket failure threshold number of TCP socket establishment failures;
    greater than a timeout threshold number of timeouts on established sockets; or
    greater than a DNS failure threshold number of DNS failures.

5. The method of claim 1,
    wherein inducing traffic on the Wi-Fi link comprises attempting to ping a serving gateway over the Wi-Fi link,
    wherein determining the failure rate of the induced traffic comprises determining a proportion of ping timeouts to ping attempts.

6. The method of claim 1,
    wherein triggering disconnection of the Wi-Fi link comprises initiating a disconnection timer and attempting to roam to a different Wi-Fi access point until successful or until expiration of the disconnection timer if one or more alternate Wi-Fi access points are available.

7. The method of claim 1, the method further comprising:
    determining that RSSI of the Wi-Fi link has risen above a second RSSI threshold based on monitoring RSSI of the Wi-Fi link; and
    disabling monitoring the plurality of link quality metrics based on determining that RSSI of the Wi-Fi link rose above the second RSSI threshold,
    wherein the second RSSI threshold is greater than the first RSSI threshold.

8. A wireless user equipment (UE) device configured to monitor link quality of a Wi-Fi link according to a plurality of link quality monitoring states and state transitions, comprising:
    a radio; and
    a processing element operably coupled to the radio;
    wherein UE is configured to:
        initially consider the Wi-Fi link to be in a first link quality state;
        transition the Wi-Fi link to a second link quality state when RSSI of the Wi-Fi link falls below a first RSSI threshold while in the first link quality state;
        monitor a plurality of network stack statistics for potential Wi-Fi link failure events while in the second link quality state;
        transition the Wi-Fi link to a third link quality state when a potential Wi-Fi link failure event is detected while in the second link quality state;
        probe the Wi-Fi link by inducing traffic on the Wi-Fi link while in the third link quality state;
        transition the Wi-Fi link to a fourth link quality state when probing the Wi-Fi link while in the third link quality state results in failure of the induced traffic and when one or more alternate Wi-Fi access point (AP) candidates are available or transition the Wi-Fi link to a fifth link quality state when probing the Wi-Fi link while in the third link quality state results in failure of the induced traffic and when no alternate Wi-Fi AP candidates are available;
        initiate a disconnection timer and attempt to roam to an alternate Wi-Fi AP of the one or more alternate Wi-Fi AP candidates while in the fourth link quality state; and
        transition the Wi-Fi link to a fifth link quality state when attempting to roam to an alternate Wi-Fi AP while in the fourth link quality state is not successful by expiration of the disconnection timer, wherein the fifth link quality state comprises a Wi-Fi disconnected state.

9. The UE of claim 8, wherein the UE is further configured to:
    transition the Wi-Fi link from any of the second, third, or fourth link quality state to the first link quality state if RSSI of the Wi-Fi link rises above a second RSSI threshold, wherein the second RSSI threshold is higher than the first RSSI threshold.

10. The UE of claim 8, wherein the UE is further configured to:
    transition the Wi-Fi link from any of the second, third, or fourth link quality state to the first link quality state if roaming to an alternate Wi-Fi AP is performed.

11. A method for a Wi-Fi chipset in a wireless user equipment (UE) device to monitor link quality of a Wi-Fi link while an application processor of the UE is in a sleep mode, the method comprising:
    monitoring RSSI of the Wi-Fi link;
    monitoring a plurality of other link quality metrics based on said monitoring RSSI of the Wi-Fi link when RSSI of the Wi-Fi link falls below a first RSSI threshold;
    determining, based on monitoring RSSI of the Wi-Fi link and monitoring the plurality of other link quality metrics, whether the Wi-Fi link is reliable; and
    providing an indication to the application processor of the UE when it is determined that the Wi-Fi link is not reliable.

12. The method of claim 11,
    wherein RSSI is monitored in a first manner when RSSI of the Wi-Fi link falls below the first RSSI threshold,
    wherein RSSI is monitored in a second manner when RSSI of the Wi-Fi link rises above a second RSSI threshold,
    wherein the second RSSI threshold is higher than the first RSSI threshold, wherein a difference between the first RSSI threshold and the second RSSI threshold induces a hysteresis in a manner of monitoring RSSI of the Wi-Fi link.

13. The method of claim 12,
wherein monitoring RSSI in the first manner comprises the Wi-Fi chipset waking to monitor Wi-Fi beacons at a higher frequency than when monitoring RSSI in the second manner.

14. The method of claim 12,
wherein a different RSSI threshold to cause the UE to roam to a new access point is used when monitoring RSSI of the Wi-Fi link in the first manner than when monitoring RSSI of the Wi-Fi link in the second manner.

15. The method of claim 12, the method further comprising:
coordinating with a Wi-Fi access point of the Wi-Fi link to increase a delivery traffic indication message (DTIM) interval for the UE when monitoring RSSI of the Wi-Fi link in the second manner.

16. The method of claim 11,
wherein the one or more additional link quality metrics comprise one or more of:
transmit packet error rate (PER) of internally generated frames;
results of active Wi-Fi link probing; or
beacon reception failure rate.

17. The method of claim 11, the method further comprising:
receiving an indication from the application processor to notify the application processor when the Wi-Fi link is not reliable,
wherein said monitoring RSSI of the Wi-Fi link, monitoring one or more additional link quality metrics, determining whether the Wi-Fi link is reliable, and providing the indication to the application processor are performed in response to the indication to notify the application processor when the Wi-Fi link is not reliable.

18. The method of claim 11, wherein monitoring RSSI of the Wi-Fi link is performed based on receiving Wi-Fi beacons from a Wi-Fi access point of the Wi-Fi link, wherein the method further comprises:
modifying wake up times for beacon reception for earlier waking to monitor RSSI of the Wi-Fi link based on the application processor being in the sleep mode.

19. The method of claim 1, wherein monitoring RSSI of the Wi-Fi link is performed based on receiving Wi-Fi beacons from a Wi-Fi access point of the Wi-Fi link, wherein the method further comprises:
modifying wake up times for beacon reception for earlier waking to monitor RSSI of the Wi-Fi link based on the application processor being in the sleep mode.

20. The method of claim 1,
wherein monitoring RSSI of the Wi-Fi link comprises the Wi-Fi chipset waking to monitor Wi-Fi beacons, and wherein monitoring RSSI of the Wi-Fi link is performed at a higher frequency after it is determined that RSSI of the Wi-Fi link has fallen below the first RSSI threshold.

* * * * *